US012767082B2

(12) United States Patent
Choi

(10) Patent No.: US 12,767,082 B2
(45) Date of Patent: Oct. 20, 2026

(54) AIR BAG COVER

(71) Applicant: HYUNDAI MOBIS CO., LTD., Seoul (KR)

(72) Inventor: Jung Geun Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/206,896

(22) Filed: May 13, 2025

(65) Prior Publication Data

US 2026/0027988 A1 Jan. 29, 2026

(30) Foreign Application Priority Data

Jul. 26, 2024 (KR) ........................ 10-2024-0099601

(51) Int. Cl.

*B60R 21/215* (2011.01)
*B60R 21/203* (2006.01)
*B29L 31/30* (2006.01)
*B60R 21/2165* (2011.01)

(52) U.S. Cl.

CPC .......... *B60R 21/215* (2013.01); *B60R 21/203* (2013.01); *B29L 2031/3038* (2013.01); *B60R 2021/21537* (2013.01); *B60R 21/21656* (2013.01)

(58) Field of Classification Search

CPC ................ B60R 21/215; B60R 21/203; B60R 21/21656; B60R 2021/21537; B60R 2021/21573; B60R 2021/21543; B29L 2031/3038

USPC ............................................. 280/728.3, 731

See application file for complete search history.

(56) References Cited

U.S. PATENT DOCUMENTS

2004/0212178 A1* 10/2004 Riesinger .............. B60R 21/216 280/730.2
2012/0068440 A1* 3/2012 Kreppold .............. B60R 21/216 280/728.2
2015/0258957 A1* 9/2015 Liu ........................ B60R 21/215 280/728.2
2019/0315301 A1* 10/2019 Patnala ............... B60R 13/0256

FOREIGN PATENT DOCUMENTS

DE 10104036 A1 * 8/2001 ........... B60R 21/216
KR 20210017148 A * 2/2021 ......... B60R 11/0235
KR 20220029124 A * 3/2022 ......... B60R 21/2035
KR 20220105386 A * 7/2022 ........... B60R 21/203

* cited by examiner

*Primary Examiner* — Keith J Frisby
(74) *Attorney, Agent, or Firm* — NSIP Law

(57) ABSTRACT

An air bag cover is provided. The air bag cover includes: a main cover assembled to an air bag housing to cover an air bag cushion disposed in the air bag housing, the main cover including a hinge portion that is formed on an inner surface of the main cover, and the main cover is rotatable and openable about the hinge portion upon an expansion of the air bag cushion; and an inner cover assembled to the inner surface of the main cover to cover the hinge portion, and to open together with the main cover, wherein the inner cover includes an extension portion disposed adjacent to the hinge portion, and the extension portion is extendable upon an opening of the main cover, and wherein a rigidity of the hinge portion is less than a rigidity of the main cover.

20 Claims, 6 Drawing Sheets

AIR BAG COVER

CROSS-REFERENCE TO RELATED APPLICATION(S)

This application claims priority to and the benefit under 35 USC § 119 of Korean Patent Application No. 10-2024-0099601, filed on Jul. 26, 2024, in the Korean Intellectual Property Office, the disclosure of which is incorporated herein by reference in its entirety for all purposes.

BACKGROUND

1. Field

The present disclosure relates to an air bag cover capable of preventing damage to an inner cover upon expansion of a driver air bag.

2. Description of the Related Art

A driver air bag is assembled to a steering wheel.

The air bag module of the driver air bag is constructed such that an air bag cushion and an inflator are accommodated in an air bag housing and the air bag housing is covered by an air bag cover.

When a sensor of the inflator detects a signal upon occurrence of a vehicle accident, a gas-forming agent is instantaneously released and ignited by means of an igniter, thereby generating gas.

The generated gas is supplied to the air bag cushion, and the air bag cushion is appropriately expanded, thereby absorbing impact applied to a driver and thus ensuring driver safety.

Meanwhile, the air bag cover of the driver air bag may be provided with an emblem for the vehicle, and the emblem may be provided with a lighting structure.

When the emblem is provided with the lighting structure, the weight of the emblem increases due to the lighting structure. Accordingly, in order to stably mount the illuminated emblem, there is a need to reinforce the structure of the air bag cover.

Accordingly, an inner cover is coupled to the inner surface of a main cover defining the outer surface of the air bag cover, and the illuminated emblem is assembled to the inner cover, thereby improving reliability of the mounting structure of the illuminated emblem.

However, because the main cover and the inner cover are simultaneously rotated together upon activation of the air bag, there may be a problem in that excessive tensile force is applied to a portion of the inner cover and thus the inner cover is damaged due to the difference in radius of curvature between the main cover and the inner cover.

Details described as the background art are intended merely for the purpose of promoting an understanding of the background of the present invention and should not be construed as an acknowledgment of the prior art that is already known to those of ordinary skill in the art.

SUMMARY

Therefore, the present disclosure has been made in view of the above problems, and it is an object of the present disclosure to provide an air bag cover capable of preventing damage to an inner cover upon expansion of a driver air bag.

Objects, which are to be achieved by the present invention, are not limited to the above-mentioned object, and other objects of the present invention, which are not mentioned above, will be clearly understood by those skilled in the art to which the present invention belongs, from the following descriptions.

In a general aspect, an air bag cover includes: a main cover assembled to an air bag housing and configured to cover an air bag cushion disposed in the air bag housing, the main cover including a hinge portion that is formed on an inner surface of the main cover, and the main cover is configured to rotate and open about the hinge portion upon an expansion of the air bag cushion; and an inner cover assembled to the inner surface of the main cover to cover the hinge portion, and configured to open together with the main cover, wherein the inner cover includes an extension portion disposed adjacent to the hinge portion, and the extension portion is configured to extend upon an opening of the main cover, and wherein a rigidity of the hinge portion is less than a rigidity of the main cover.

The hinge portion may be formed to have an S-shaped concave groove, wherein the extension portion has a corrugated shape.

The extension portion may include two ends that are bent to project toward the main cover.

The extension portion may be spaced apart from the main cover.

The extension portion may include: a plurality of convex portions that project toward the main cover; at least one concave portion that projects toward the air bag cushion; and an uppermost convex portion of the extension portion disposed to face the hinge portion, wherein the convex portion and the concave portion may be alternately connected to each other.

A direction in which the groove in the hinge portion is formed and a direction in which the convex portion is bent may coincide with each other.

The uppermost convex portion may be spaced outwards apart from the groove in the hinge portion, and a remaining convex portion may be spaced apart from the inner surface of the main cover.

The uppermost convex portion may be received in the groove in the hinge portion, and a remaining convex portion may be spaced apart from the inner surface of the main cover.

The uppermost convex portion may be received in the groove in the hinge portion, and a remaining convex portion may be in contact with the inner surface of the main cover.

The inner surface of the main cover includes a mounting portion, wherein a lowermost convex portion of the extension portion is in surface contact with and supported by the mounting portion.

In another general aspect, an air bag cover for a vehicle, includes: a main cover for assembly to an air bag housing to cover an air bag cushion received in the air bag housing, the main cover including a hinge portion formed on an inner surface thereof and having reduced rigidity such that the main cover is rotatable and openable about the hinge portion upon expansion of the air bag cushion; and an inner cover assembled to the inner surface of the main cover to cover the hinge portion, the inner cover including an extension portion adjacent to the hinge portion, wherein, upon opening of the main cover, the inner cover is configured to be opened together with the main cover, and the extension portion is configured to be extendable.

The hinge portion may be formed to have an S-shaped concave groove, wherein the extension portion may have a corrugated shape.

The extension portion may include two ends that are bent to project toward the main cover.

The extension portion may be spaced apart from the main cover.

The extension portion may include: a plurality of convex portions that project toward the main cover; at least one concave portion that projects toward the air bag cushion; and an uppermost convex portion facing the hinge portion, wherein the convex portion and the concave portion may be alternately connected to each other.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
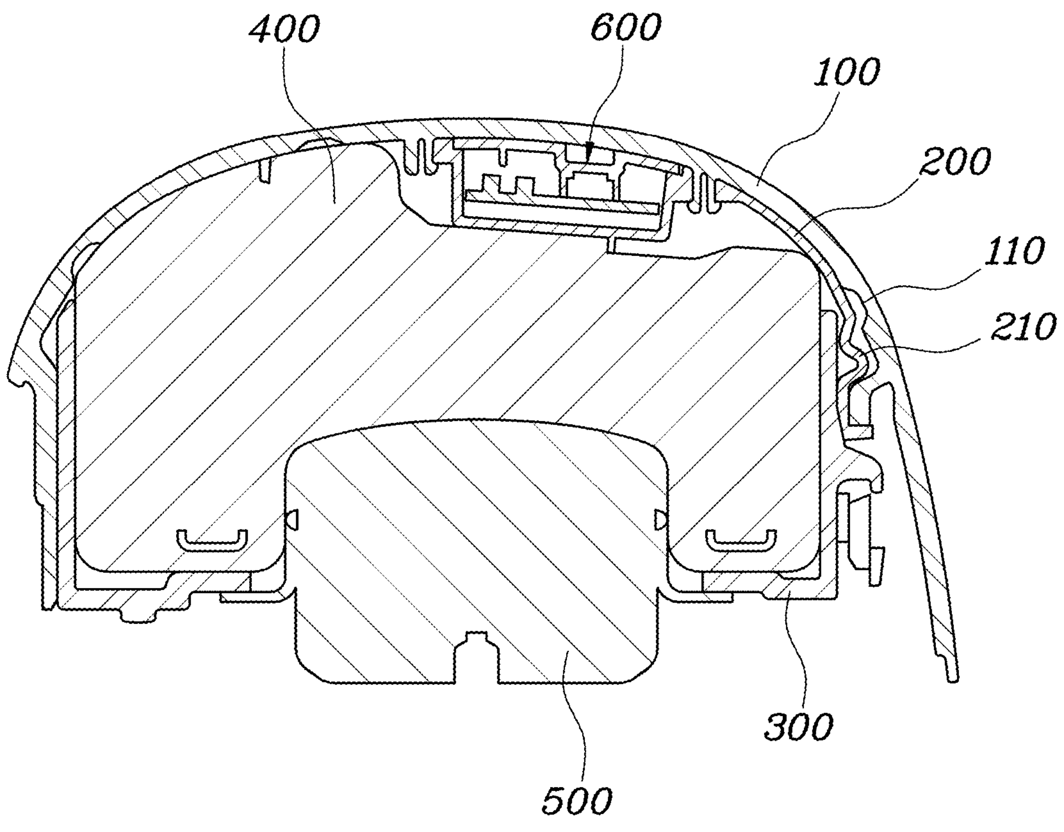
FIG. 1 is a cross-sectional view of a driver air bag according to an embodiment of the present disclosure.

In the following description of embodiments disclosed herein, if it is decided that a detailed description of known functions or configurations related to the invention would make the subject matter of the invention unclear, such detailed description is omitted. The accompanying drawings are used to assist in easy understanding of various technical features, and it should be understood that the embodiments presented herein are not limited by the accompanying drawings. As such, the present disclosure should be construed to extend to any alterations, equivalents, and substitutes, in addition to those which are particularly set out in the accompanying drawings.

It will be understood that although the terms “first”, “second”, etc. may be used herein to describe various elements, these elements should not be construed as being limited by these terms. These terms are only used to distinguish one element from another.

As used herein, the singular forms “a,” “an” and “the” are intended to include the plural forms as well, unless the context clearly indicates otherwise.

It will be further understood that the terms “comprise”, “include”, “have”, etc. when used in this specification specify the presence of stated features, integers, steps, operations, elements, components, or combinations thereof, but do not preclude the presence or addition of one or more other features, integers, steps, operations, elements, components, or combinations thereof.

In general, suffixes such as “module” and “unit”, when used in the following description, may be used to refer to elements or components for ease of preparation of the specification. The use of such suffixes herein is merely intended to facilitate the description of the specification, and the suffixes do not imply any special meaning or function.

It should be understood that, when an element is referred to as being “connected to” another element, there may be intervening elements present, or the element may be directly connected with the other element. In contrast, it should be understood that, when an element is referred to as being “directly connected to” another element, there are no intervening elements present.

A description will now be given in detail according to exemplary embodiments disclosed herein, with reference to the accompanying drawings. For the sake of brevity of description with reference to the drawings, the same or equivalent components may be denoted by the same reference numbers, and a description thereof will not be repeated.

An air bag cover according to the present disclosure may include a main cover 100 which is constructed to have a shape covering an air bag cushion 400 received in an air bag housing 300 and which has a hinge portion 110 formed in the inner surface thereof and having a low rigidity to allow the main cover 100 to be rotated and opened about the hinge portion 110 upon expansion of the air bag cushion 400, and an inner cover 200 which is assembled to the inner surface of the main cover 100 to cover the hinge portion 110 and to be opened together with the main cover 100 and which includes an extension portion 210, adjacent to the hinge portion 110, which is extended upon opening of the main cover 100.

Figure 2:
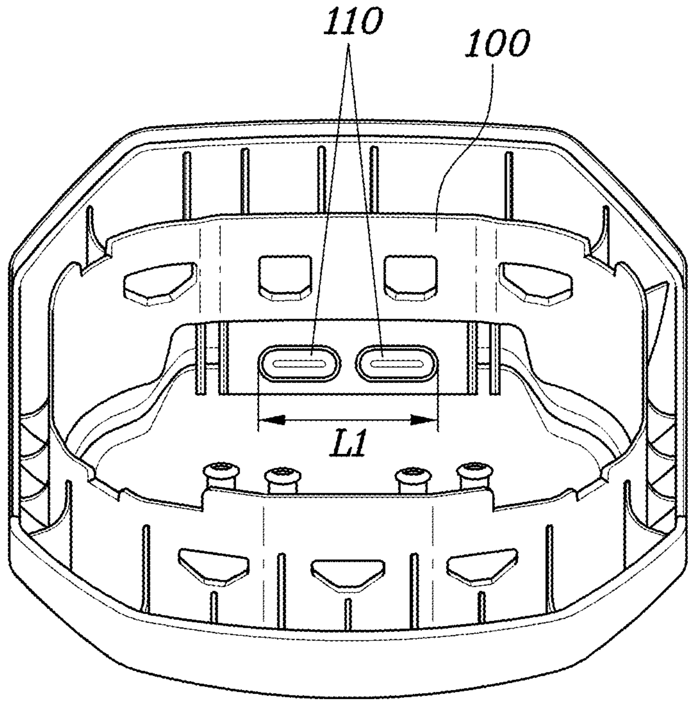
FIG. 2 is a view illustrating the shape of a hinge portion according to the present disclosure.
Figure 3:
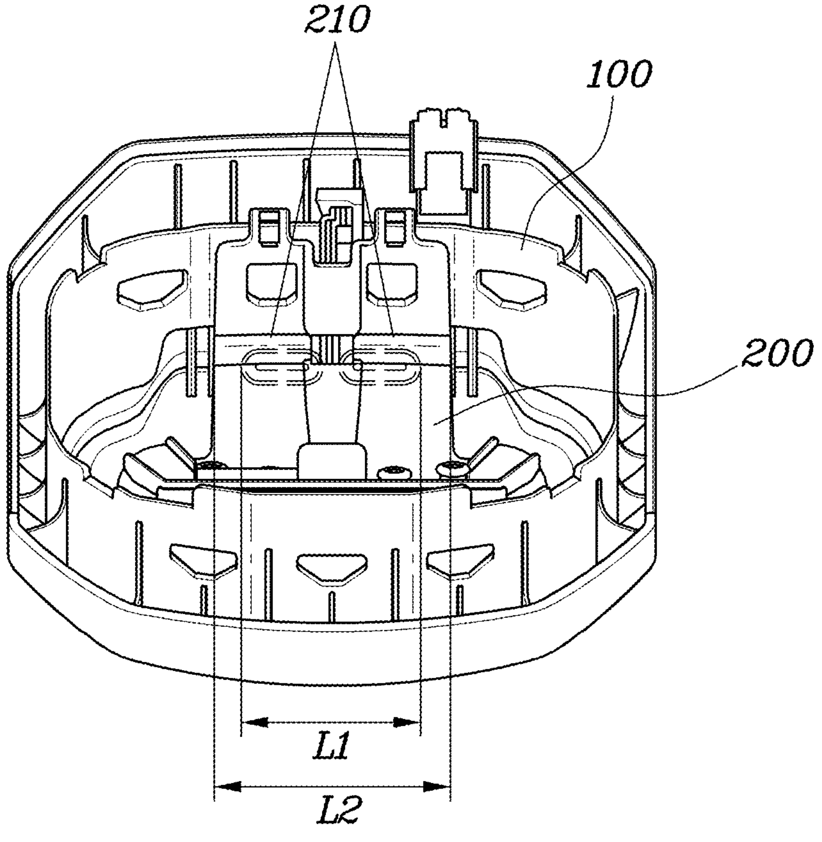
FIG. 3 is a view illustrating the shape of an extension portion according to the present disclosure.

Referring to FIGS. 1 to 3, specifically, an air bag module of a driver air bag device may include the air bag housing 300, the air bag cover, an inflator 500, and the air bag cushion 400.

The air bag housing 300 may be constructed to have the shape of a cylinder having an upper open end and to be perforated vertically so as to receive the inflator 500 therein.

The air bag cushion 400 may be connected to the inflator 500, and gas may be supplied to the air bag cushion 400. The air bag cushion 400 may be received in the air bag housing 300 in the collapsed state.

The air bag cover may have a shape covering the collapsed air bag cushion 400 and may be assembled onto the air bag housing 300.

The air bag cover may include the main cover 100 and the inner cover 200.

The main cover 100 may be formed to have the form of a dome. The hinge portion 110 may be formed in the inner surface of the main cover 100 adjacent to the edge of the upper end of the air bag housing 300, and may have lower rigidity than the remaining portion of the main cover 100.

Consequently, the main cover 100 may be rotated and opened about the hinge portion 110 upon expansion of the air bag cushion 400.

The inner cover 200 may be assembled with the main cover 100 so as to cover a portion of the inner surface of the main cover 100, and an illuminated emblem 600 may be assembled with the portion of the inner cover 200 that overlaps the ceiling surface of the main cover 100. Therefore, the illuminated emblem 600 may be rotated together with the inner cover 200 upon rotation of the main cover 100.

Particularly, the inner cover 200 may be provided with the extension portion 210, which is formed at a position adjacent to the hinge portion 110 between the hinge portion 110 and the air bag housing 300. The extension portion 210 may be extended upon rotation of the inner cover 200.

In other words, when the air bag expands, the main cover 100 and the inner cover 200 may be rotated and opened about the hinge portion 110 by virtue of the expanding force of the air bag cushion 400.

Here, because the main cover 100 and the inner cover 200 are rotated about the hinge portion 110, the radius of curvature of the inner cover 200 may become greater than the radius of curvature of the main cover 100.

Accordingly, when the inner cover 200 is rotated, the extension portion 210 may be extended by the length difference in radius of curvature between the main cover 100 and the inner cover 200. Consequently, it is possible to prevent excessive tensile force from being applied to the portion of the inner cover 200 adjacent to the hinge portion 110 and thus to prevent damage to the inner cover 200.

Referring to FIG. 1, according to the present disclosure, the hinge portion 110 may be formed to have the form of a concave groove (e.g., an S-shaped concave groove), and the extension portion 210 may be formed to have a corrugated shape.

Specifically, because the hinge portion 110, which has an arched concave groove, is formed in the inner surface of the main cover 100, the portion of the main cover 100 at which the hinge portion 110 is formed may have reduced rigidity, thus allowing the main cover 100 to be rotated about the hinge portion 110.

Furthermore, because the extension portion 210 is formed in a zigzag shape at the inner cover 200 adjacent to the hinge portion 110, the corrugated portion may be stretched, thus increasing the length of the extension portion 210.

Figure 4:
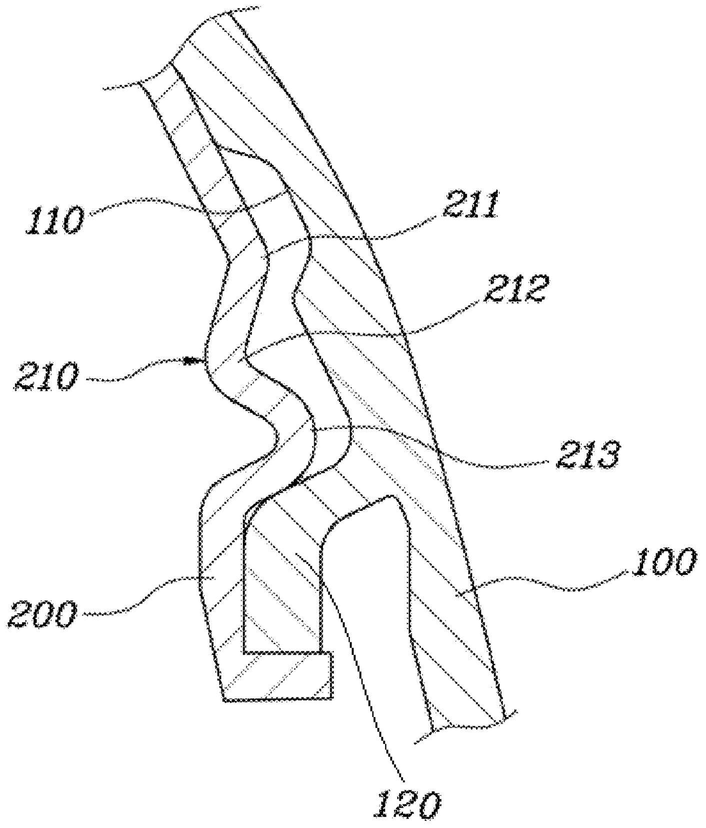
FIG. 4 is a view illustrating the structure of a first embodiment of the extension portion according to the present disclosure.

Referring to FIG. 4, according to the present disclosure, the two ends of the extension portion 210 may be bent so as to project toward the main cover 100.

For example, the extension portion 210 may be bent several times in a zigzag shape.

Specifically, the upper end and the lower end of the extension portion 210, which respectively correspond to the start and the end of the extension portion, may be formed so as to project toward the main cover 100.

The extension portion 210 may be spaced apart from the main cover 100.

As illustrated in FIGS. 2 and 3, generally, the width (L1) of the hinge portion 110 formed at the main cover 100 and the widthwise length (L2) of the extension portion 210 having the corrugated shape may be different from each other, and it is difficult to cause the widthwise length to be identical to each other.

Accordingly, it is preferable that the extension portion 210 be geometrically spaced apart from the portion of the main cover 100.

For example, the extension portion 210 may be entirely spaced apart from the main cover 100, as illustrated in FIG. 4.

Figure 5:
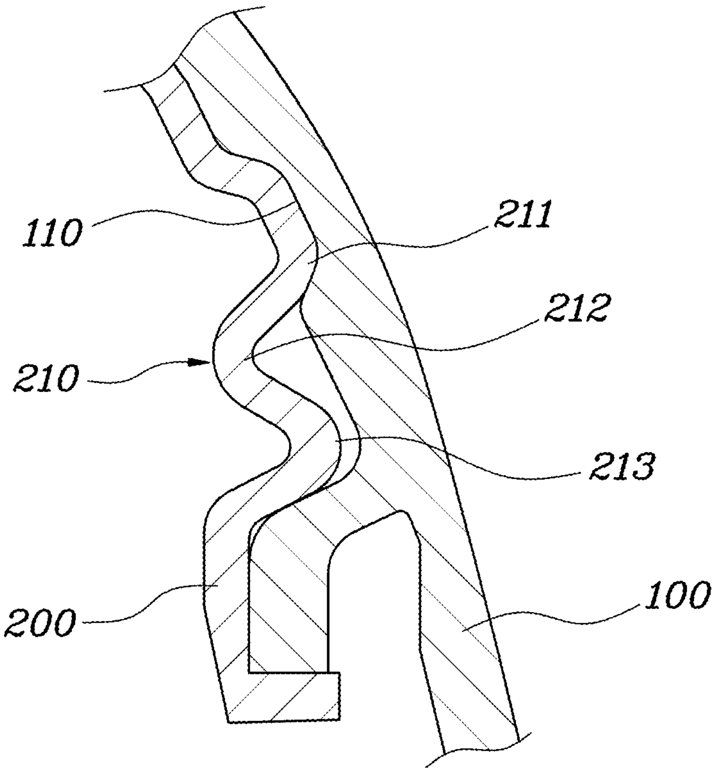
FIG. 5 is a view illustrating the structure of a second embodiment of the extension portion according to the present disclosure.
Figure 6:
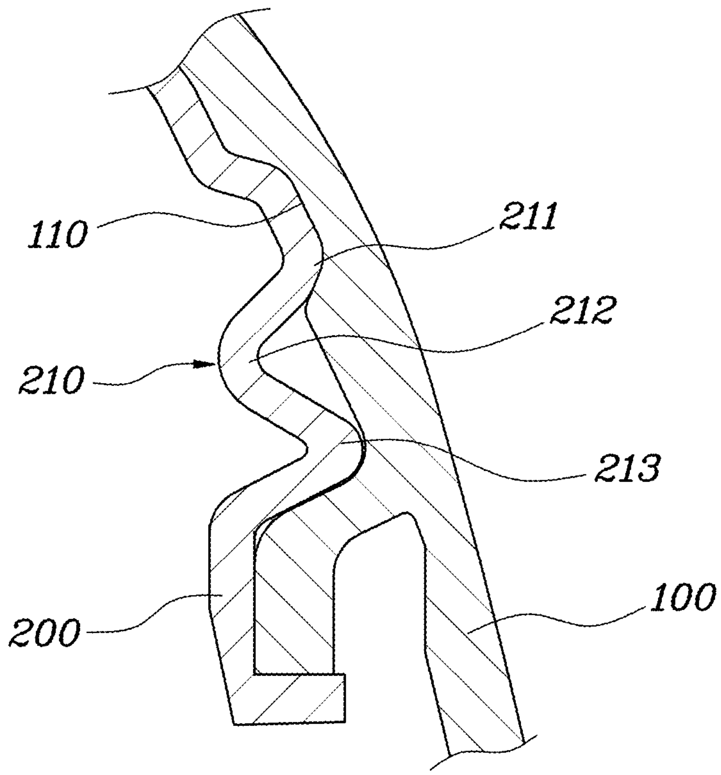
FIG. 6 is a view illustrating the structure of a third embodiment of the extension portion according to the present disclosure.

Alternatively, the extension portion 210 may be partially spaced apart from the main cover 100, as illustrated in FIGS. 5 and 6.

The shape of the extension portion 210 and the relationships between the extension portion 210 and the hinge portion 110, according to the present disclosure, will now be described in detail. The extension portion 210 may be composed of a convex portion, which projects toward the main cover 100, and a concave portion 212, which projects toward the air bag cushion 400, wherein the convex portion and the concave portion are alternately repeated. The uppermost convex portion 211 of the extension portion 210 may be disposed so as to face the hinge portion 110.

For example, the uppermost convex portion 211 may be formed so as to project toward the main cover 100, the concave portion 212, which projects toward the air bag housing 300, may be connected to the lower end of the uppermost convex portion 211, and the lowermost convex portion 213, which projects toward the main cover 100, may be connected to the lower end of the concave portion 212, as illustrated in FIG. 4.

The hinge portion 110 may be formed at the portion of the main cover 100 that faces the uppermost convex portion 211.

Particularly, the direction in which the groove in the hinge portion 110 is formed and the direction in which the convex portion that faces the groove is formed may coincide with each other.

Because the direction in which the groove in the hinge portion 110 is formed and the direction in which the uppermost convex portion 211 is formed may coincide with each other, the uppermost convex portion 211 and the hinge portion 110 may be bent in the same direction upon expansion of the air bag, thereby allowing the main cover 100 and the inner cover 200 to be more easily rotated and opened.

According to the present disclosure, the uppermost convex portion 211 may be spaced outwards apart from the hinge portion 110, and the remaining convex portion may be spaced apart from the inner surface of the main cover 100.

In other words, because the uppermost convex portion 211 is disposed at a position avoiding the hinge portion 110, it is possible to basically prevent the uppermost convex portion 211 from interfering with the hinge portion 110 and thus to allow the main cover to be stably rotated during expansion of the air bag.

Furthermore, because the lowermost convex portion 213 is disposed at a position spaced apart from the main cover 100, the lowermost convex portion 213 may not also interfere with the main cover during expansion of the air bag, thereby allowing the main cover to be more stably rotated.

Alternatively, the present disclosure may be constructed such that the uppermost convex portion 211 is received in the groove in the hinge portion 110 and the remaining convex portion is spaced apart from the inner surface of the main cover 100, as illustrated in FIG. 5.

In other words, the uppermost convex portion 211 may be received in the groove in the hinge portion 110 in a manner of being fitted into the groove.

In this embodiment, because the direction in which the groove in the hinge portion 110 is formed and the direction in which the uppermost convex portion 211 is bent are identical to each other although the uppermost convex portion 211 partially interferes with the inner surface of the hinge portion 110, dissimilar to the embodiment shown in FIG. 4, the uppermost convex portion 211 and the hinge portion 110 may be bent in the same direction during expansion of the air bag, thereby allowing the main cover to be easily rotated.

Furthermore, because the lowermost convex portion 213 is disposed at a position spaced apart from the main cover 100, similar to the embodiment shown in FIG. 4, the lowermost convex portion 213 may not interfere with the main cover 100 during expansion of the air bag, thereby allowing the main cover to be more stably rotated.

Alternatively, the present disclosure may be constructed such that the uppermost convex portion 211 is received in the groove in the hinge portion 110 and the remaining convex portion may contact the inner surface of the main cover 100, as illustrated in FIG. 6.

In other words, because the direction in which the groove in the hinge portion 110 is formed and the direction in which the uppermost convex portion 211 is bent are identical to each other although the uppermost convex portion 211 is received in the groove in the hinge portion 110 and thus the uppermost convex portion 211 partially interferes with the inner surface of the hinge portion 110, similar to the embodiment shown in FIG. 5, the uppermost convex portion 211 and the hinge portion 110 may be bent in the same direction during expansion of the air bag, thereby allowing the main cover to be easily rotated.

As illustrated in FIG. 4, according to the present disclosure, a mounting portion 120 may be formed on the inner surface of the main cover 100 so as to project therefrom, and the lowermost convex portion 213 of the extension portion 210 may be in surface contact with the mounting portion 120 and may be supported thereby.

For example, the upper end of the inner cover 200 may serve to assemble the illuminated emblem 600 to the ceiling surface of the main cover 100.

The lower end of the inner cover 200 may extend between the outer side of the housing and the inner side of the main cover 100 and may project toward the main cover 100, and the mounting portion 120, which has a hook shape, may be provided on the inner side of the main cover so as to project toward the inner cover and may be seated on the lower end of the inner cover 200 and be supported thereby.

Particularly, because the lower surface of the lowermost convex portion 213 may be seated on the upper surface of the mounting portion 120 and be supported thereby, the illuminated emblem 600 may be firmly assembled to the air bag module.

As described above, according to the present disclosure, because the extension portion 210 is extended by the length difference in radius of curvature between the main cover 100 and the inner cover 200 when the inner cover 200 is rotated, it is possible to prevent excessive tensile force from being applied to the portion of the inner cover 200 adjacent to the hinge portion 110 and thus to prevent damage to the inner cover 200.

As is apparent from the above description, the present disclosure provides an advantage of preventing excessive tensile force from being applied to the portion of the inner cover adjacent to the hinge portion and thus of preventing damage to the inner cover because the extension portion is extended by the length difference in radius of curvature between the main cover and the inner cover when the inner cover is rotated.

Effects, which can be obtained by the present invention, are not limited to the above-mentioned effects, and other effects of the present invention, which are not mentioned above, will be clearly understood by those skilled in the art to which the present invention belongs, from the following descriptions.

Although the preferred embodiments of the present invention have been described above with reference to the accompanying drawings, those skilled in the art will appreciate that the present invention can be implemented in various other embodiments without changing the technical ideas or features thereof.

What is claimed is:

1. An air bag cover, comprising:

a main cover assembled to an air bag housing and configured to cover an air bag cushion disposed in the air bag housing, the main cover comprising a hinge portion that is formed on an inner surface of the main cover, and the main cover is configured to rotate and open about the hinge portion upon an expansion of the air bag cushion; and an inner cover assembled to the inner surface of the main cover to cover the hinge portion, and configured to open together with the main cover, wherein the inner cover comprises an extension portion disposed adjacent to the hinge portion, and the extension portion is configured to extend upon an opening of the main cover, wherein a rigidity of the hinge portion is less than a rigidity of the main cover, wherein the hinge portion is formed to have a flexible S-shaped concave groove, and wherein the extension portion has a corrugated shape and is spaced apart from the main cover.

2. The air bag cover according to claim 1, wherein the extension portion includes two ends that are bent to project toward the main cover.

3. The air bag cover according to claim 1, wherein the extension portion comprises:

a plurality of convex portions that project toward the main cover;

at least one concave portion that projects toward the air bag cushion; and an uppermost convex portion of the extension portion is disposed to face the hinge portion, wherein the uppermost convex portion and the concave portion are alternately connected to each other.

4. The air bag cover according to claim 3, wherein a direction in which the groove in the hinge portion is formed and a direction in which the uppermost convex portion of the extension portion is bent coincide with each other.

5. The air bag cover according to claim 3, wherein the uppermost convex portion of the extension portion is spaced outwards apart from the groove in the hinge portion, and a remaining convex portion of the extension portion is spaced apart from the inner surface of the main cover.

6. The air bag cover according to claim 3, wherein the uppermost convex portion of the extension portion is received in the groove in the hinge portion, and a remaining convex portion of the extension portion is spaced apart from the inner surface of the main cover.

7. The air bag cover according to claim 3, wherein the uppermost convex portion of the extension portion is received in the groove in the hinge portion, and a remaining convex portion of the extension portion is in contact with the inner surface of the main cover.

8. The air bag cover according to claim 3, wherein the inner surface of the main cover includes a mounting portion, and wherein a lowermost convex portion of the extension portion is in surface contact with, and supported by, the mounting portion.

9. An air bag cover for a vehicle, the air bag cover comprising:

a main cover assembled to an air bag housing, and configured to cover an air bag cushion disposed in the air bag housing, the main cover comprising a hinge portion that is formed on an inner surface of the main cover, and the main cover is configured to rotate and open about the hinge portion upon an expansion of the air bag cushion; and an inner cover assembled to the inner surface of the main cover to cover the hinge portion, the inner cover comprising an extension portion that is disposed adjacent to the hinge portion, wherein, upon opening of the main cover, the inner cover is configured to open together with the main cover, and the extension portion is configured to extend, wherein the hinge portion is formed to have a flexible S-shaped concave groove, and wherein the extension portion has a corrugated shape and is spaced apart from the main cover.

10. The air bag cover according to claim 9, wherein the extension portion includes two ends that are bent to project toward the main cover.

11. The air bag cover according to claim 9, wherein the extension portion comprises:

a plurality of convex portions that project toward the main cover;

at least one concave portion that projects toward the air bag cushion; and an uppermost convex portion that faces the hinge portion, wherein the uppermost convex portion and the concave portion are alternately connected to each other.

12. An air bag cover, comprising:

a main cover assembled to an air bag housing and configured to cover an air bag cushion disposed in the air bag housing, the main cover comprising a hinge portion that is formed on an inner surface of the main cover, and the main cover is configured to rotate and open about the hinge portion upon an expansion of the air bag cushion; and an inner cover assembled to the inner surface of the main cover to cover the hinge portion, and configured to open together with the main cover, wherein the inner cover comprises an extension portion disposed adjacent to the hinge portion, and the extension portion is configured to extend upon an opening of the main cover, wherein a rigidity of the hinge portion is less than a rigidity of the main cover, wherein the hinge portion is formed to have an S-shaped concave groove, and wherein the extension portion has a corrugated shape.

13. The air bag cover according to claim 12, wherein the extension portion includes two ends that are bent to project toward the main cover.

14. The air bag cover according to claim 12, wherein the extension portion is spaced apart from the main cover.

15. The air bag cover according to claim 12, wherein the extension portion comprises:

a plurality of convex portions that project toward the main cover;

at least one concave portion that projects toward the air bag cushion; and an uppermost convex portion of the extension portion is disposed to face the hinge portion, wherein the uppermost convex portion and the concave portion are alternately connected to each other.

16. The air bag cover according to claim 15, wherein a direction in which the groove in the hinge portion is formed and a direction in which the uppermost convex portion of the extension portion is bent coincide with each other.

17. The air bag cover according to claim 15, wherein the uppermost convex portion of the extension portion is spaced outwards apart from the groove in the hinge portion, and a remaining convex portion of the extension portion is spaced apart from the inner surface of the main cover.

18. The air bag cover according to claim 15, wherein the uppermost convex portion of the extension portion is received in the groove in the hinge portion, and a remaining convex portion of the extension portion is spaced apart from the inner surface of the main cover.

19. The air bag cover according to claim 15, wherein the uppermost convex portion of the extension portion is received in the groove in the hinge portion, and a remaining convex portion of the extension portion is in contact with the inner surface of the main cover.

20. The air bag cover according to claim 15, wherein the inner surface of the main cover includes a mounting portion, and wherein a lowermost convex portion of the extension portion is in surface contact with, and supported by, the mounting portion.

* * * * *